United States Patent [19]
Hauser et al.

[11] 3,890,850
[45] June 24, 1975

[54] TRANSMISSION WITH DRAW-KEY TYPE SHIFT

[75] Inventors: Hans Hauser; Robert D. McGuire, both of Fredericktown, Ohio

[73] Assignee: The J. B. Foote Foundry Co., Fredericktown, Ohio

[22] Filed: May 21, 1973

[21] Appl. No.: 362,116

[52] U.S. Cl. ............... 74/372; 74/366; 192/48.91
[51] Int. Cl. ...................... F16h 3/08; F16d 21/04
[58] Field of Search .................. 74/372, 366, 475; 192/48.91

[56] References Cited
UNITED STATES PATENTS

| | | | |
|---|---|---|---|
| 752,007 | 2/1904 | Snider | 74/372 |
| 804,212 | 11/1905 | Cary | 74/372 |
| 1,102,427 | 7/1914 | Morgan | 74/372 |
| 1,371,187 | 3/1921 | Pulliam | 74/372 |
| 3,362,244 | 1/1968 | Ivanchich | 74/372 X |

FOREIGN PATENTS OR APPLICATIONS

| | | | |
|---|---|---|---|
| 370,872 | 10/1930 | United Kingdom | 74/366 |

*Primary Examiner*—Samuel Scott
*Assistant Examiner*—P. S. Lall
*Attorney, Agent, or Firm*—Allen D. Gutchess, Jr.

[57] ABSTRACT

A transmission shift generally of the draw-key type is provided. A driven shaft has a longitudinally-extending channel or groove therein with a plurality of gears rotatably mounted thereon. A plurality of projections or keys are located in the channel, preferably one for each gear. A carrier in the channel spaces apart the keys at distances such that not more than one key can engage one gear at any time. The keys are resiliently mounted and are retracted in the channel except when aligned with an opening in a gear. With the multiple keys, the gears can be shifted from one end to the other with minimum motion of the shift means, requiring correspondingly less space for the transmission. The resilient mounting of the keys enables the gears to be easily shifted throughout their range, even when the transmission is stopped. The multiple key arrangement also distributes wear over a plurality of keys.

23 Claims, 13 Drawing Figures

PATENTED JUN 24 1975 3,890,850

SHEET 1

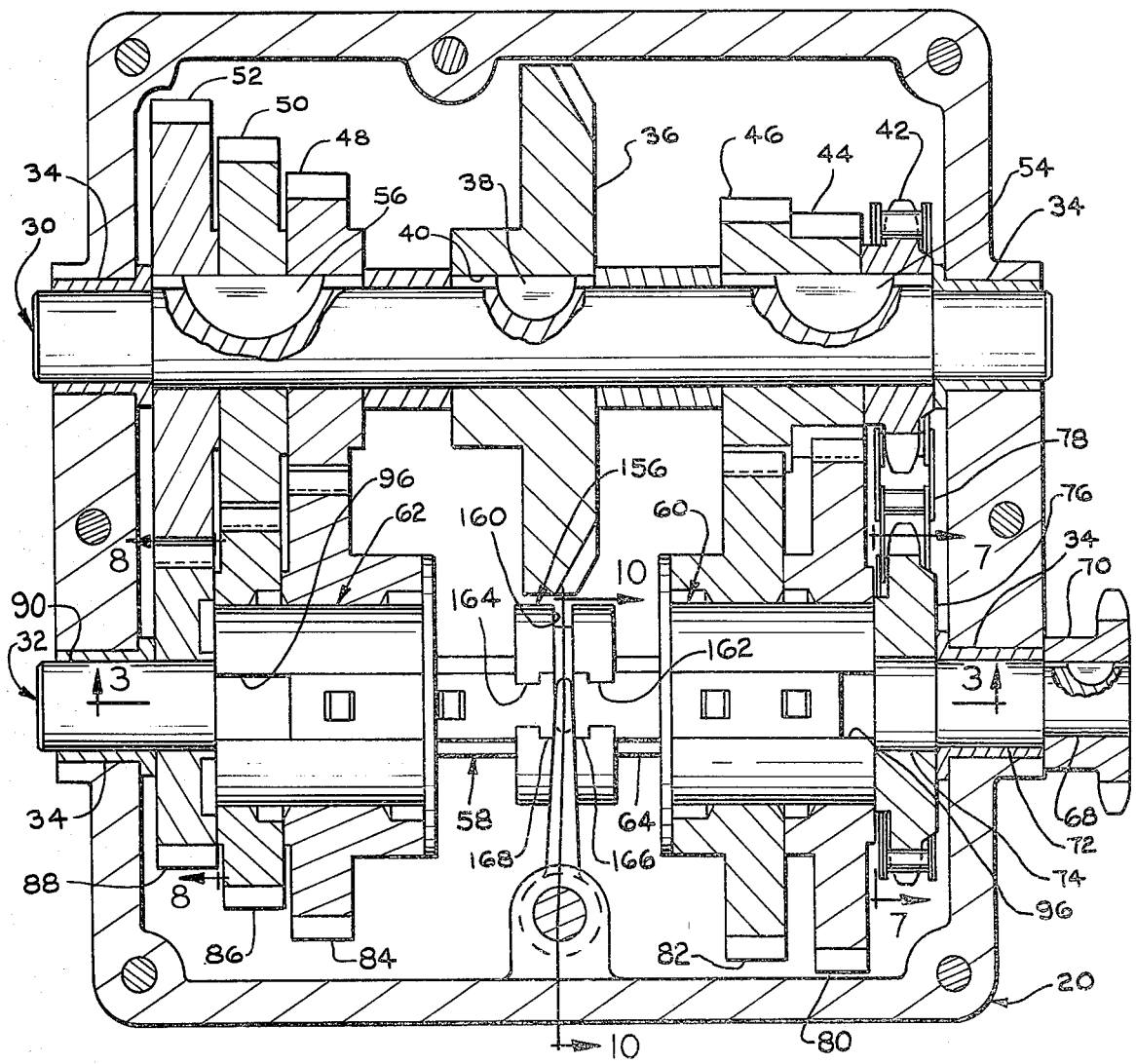
FIG. 2
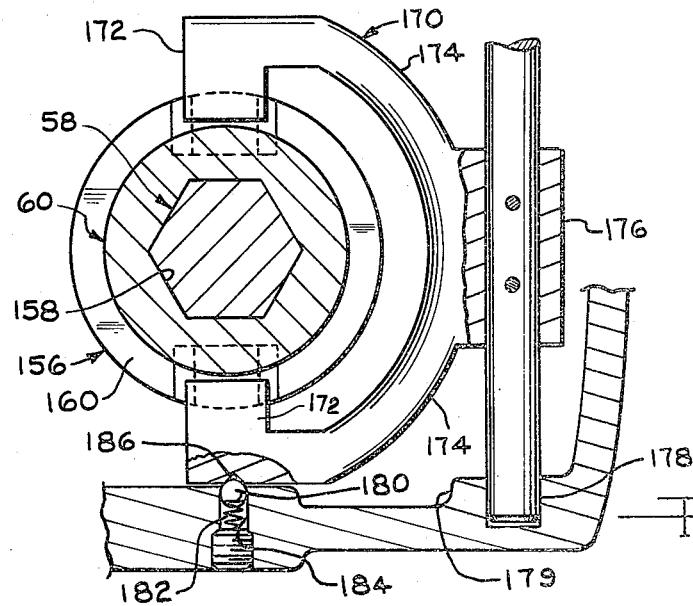
FIG. 10
FIG. 9

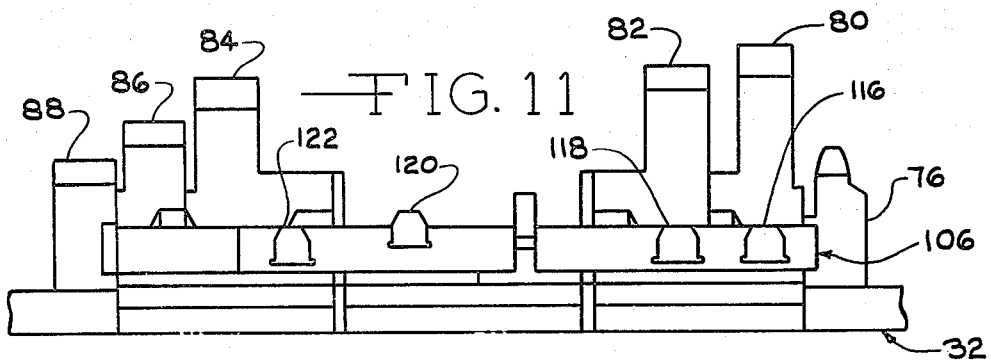
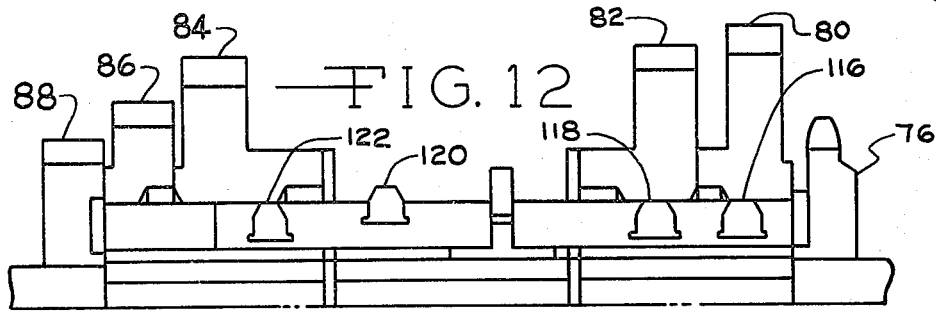
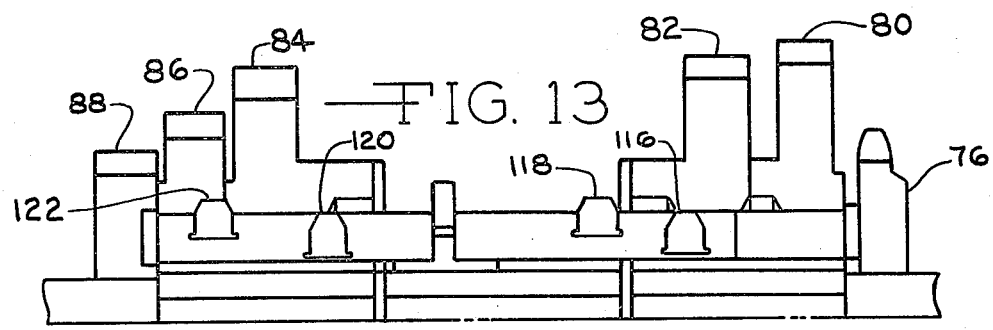
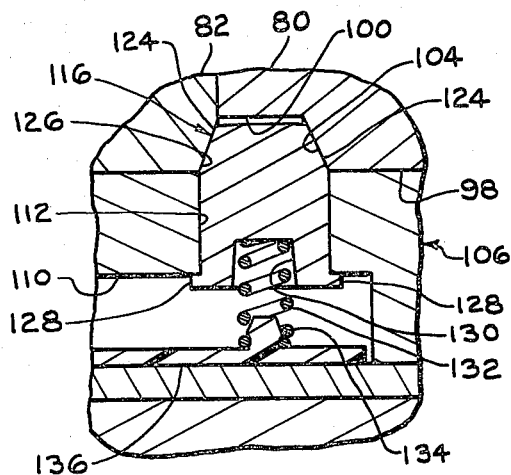
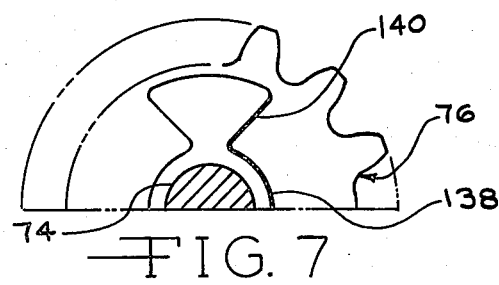
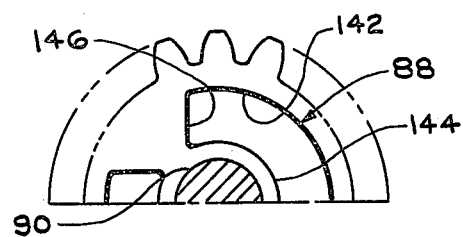

TRANSMISSION WITH DRAW-KEY TYPE SHIFT

This invention relates to a transmission and more particularly to a shift mechanism for a transmission.

The transmission shift with which the instant invention is concerned is generally of the draw-key type which includes a plurality of gears rotatably mounted on a shaft with a projection or key located in a groove in the shaft and being longitudinally movable therealong to engage the gears individually. With such transmissions heretofore commonly having one key for the several gears on the shaft, the single key, being in constant engagement with a gear, would wear more rapidly. Also, in the event of failure of the key, the entire transmission was inoperable. With this type of transmission, it was difficult to shift through the gear range since the key had to be aligned with an opening in each gear when passing through that gear and the transmission could not ordinarily be shifted at all when stationary. Also, to shift through the gear range, space was required in the transmission along the shaft which was equal to the thickness of the gear pack. This required a substantial amount of waste or empty space within the transmission. The space could be reduced by reducing the thickness of the gears employed in the pack to reduce the overall thickness thereof. However, this would place more strain and increase wear on the gears. Because of the large movement of the fork or the like used to move the key along the shaft, considerable amount of movement of the shift lever was also required. Particularly for small vehicles such as riding lawn mowers, sufficient space for the movement was not always available. The excess movement required of the shift lever was also awkward from the operator's standpoint.

The present invention provides a transmission shift mechanism generally of the above-described type, but having many advantages thereover. The shift mechanism includes a shaft having a longitudinally-extending channel on which a plurality of gears are rotatably mounted. A plurality of projections or keys, preferably one for each gear, are located in the channel and are mounted in a carrier which spaces the keys apart predetermined distances so that not more than one key can engage a gear in any given longitudinal position of the carrier on the shaft. With this multiple key arrangement, it is no longer necessary to shift the key and carrier assembly through the entire thickness of the gear pack to shift through the range thereof. Rather, the keys can be positioned so that one engages a gear for each incremental, e.g. one-eighth inch, movement of the carrier. Thus, with a transmission having five forward gears, a reverse, and a neutral, it is possible to shift through the entire arrange with less than one inch of movement of the carrier and key assembly. Consequently, the gears can be of normal full thickness, without the resulting increased wear and possible failure to which the thinner gears were subjected. The amount of space within the housing required for shifting is substantially reduced and the amount of movement needed for the shift lever is correspondingly reduced, enabling the transmission to be used with smaller vehicles where space for shifting movement is limited. The shorter shift movement also makes shifting less cumbersome. Further, the shift means can be located at an intermediate position on the shaft between the gears, rather than at an end of the shaft. This provides greater versatility in the positioning of the shift lever.

The gears in the transmission have dogs adjacent the shaft between arcuate notches in the gears. Circumferentially-extending edges of the dogs are beveled and the projections or keys are similarly beveled so as to be cammed downwardly into the channel when engaging a dog. Thus, it is possible to shift through several gears without having to wait for them to rotate to the point that their notches are aligned with the keys, as has heretofore been the case. Nor is it necessary for the transmission to be operating in order to shift through part or all of the gear range. With one key for each gear, the wear on the gears is substantially reduced. Further, in the event one key should fail, it does not render the entire transmission inoperable.

The short shifting space required for the new transmission achieves a compact design or alternately enables more gears to be employed in a transmission of a given size. Size limits are particularly important for smaller vehicles. Instead of a three speed transmission having three speeds forward and one reverse, it is possible to have five speeds forward and one reverse in the same space. The additional forward speeds have the distinct advantage of providing the operator with a motion for the vehicle similar to that achieved with hydrostatic transmissions, yet the new transmission has none of the inefficiencies experienced with small hydrostatic transmissions for smaller riding mowers and the like.

It is, therefore, a principal object of the invention to provide a transmission having a shaft with a plurality of gears thereon and with individual keys for each of at least several of the gears.

Another object of the invention is to provide a multi-speed transmission requiring less space for the shifting mechanism.

A further object of the invention is to provide a multi-speed transmission requiring less movement of the shift lever when shifting among gears.

Yet another object of the invention is to provide shift mechanism for a transmission including a plurality of resiliently mounted keys which enable the transmission to be shifted among gears more easily and even when stopped.

Yet a further object of the invention is to provide a transmission in which more gears providing additional speeds can be located within a given space.

Still another object of the invention is to provide a multi-speed transmission in which the shift mechanism can be located at intermediate positions on the shaft between gears thereon.

Other objects and advantages of the invention will be apparent from the following detailed description of a preferred embodiment thereof, reference being made to the accompanying drawings, in which:

FIG. 2 is an enlarged view in horizontal cross section taken centrally through the transmission of FIG. 1;

FIG. 4 is an enlarged, detailed view in section of a portion of the transmission shift of FIG. 3;

Figure 3:
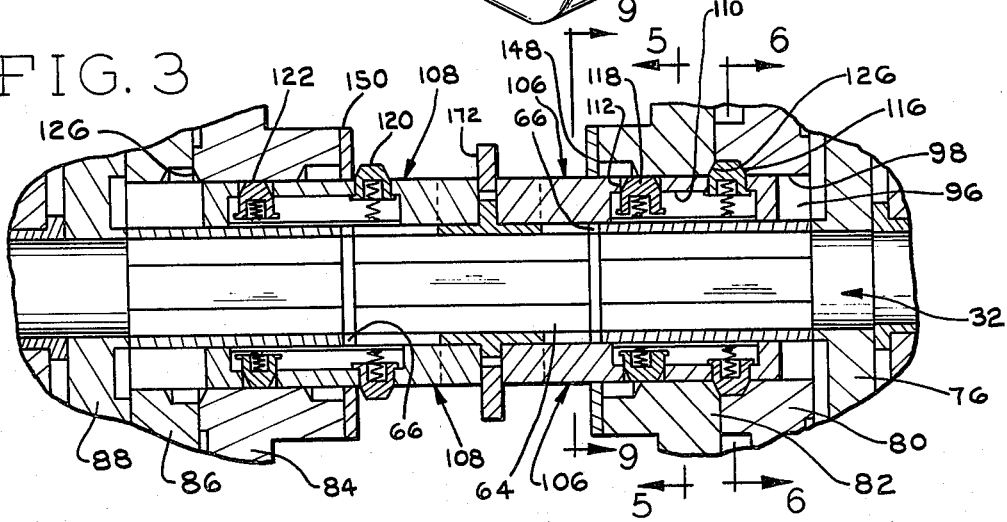
FIG. 3 is a view in longitudinal cross section of a shaft of the transmission, taken along the line 3—3 of FIG. 2.

FIGS. 7 and 8 are detailed views in section, taken along the lines 7—7 and 8—8 of FIG. 2;

FIG. 9 is an enlarged view in transverse cross section taken along the line 9—9 of FIG. 3;

FIG. 10 is an enlarged view in transverse cross section taken along the line 10—10 of FIG. 2; and FIGS. 11–13 are schematic views in longitudinal cross section showing the shift components in various positions.

Figure 1:
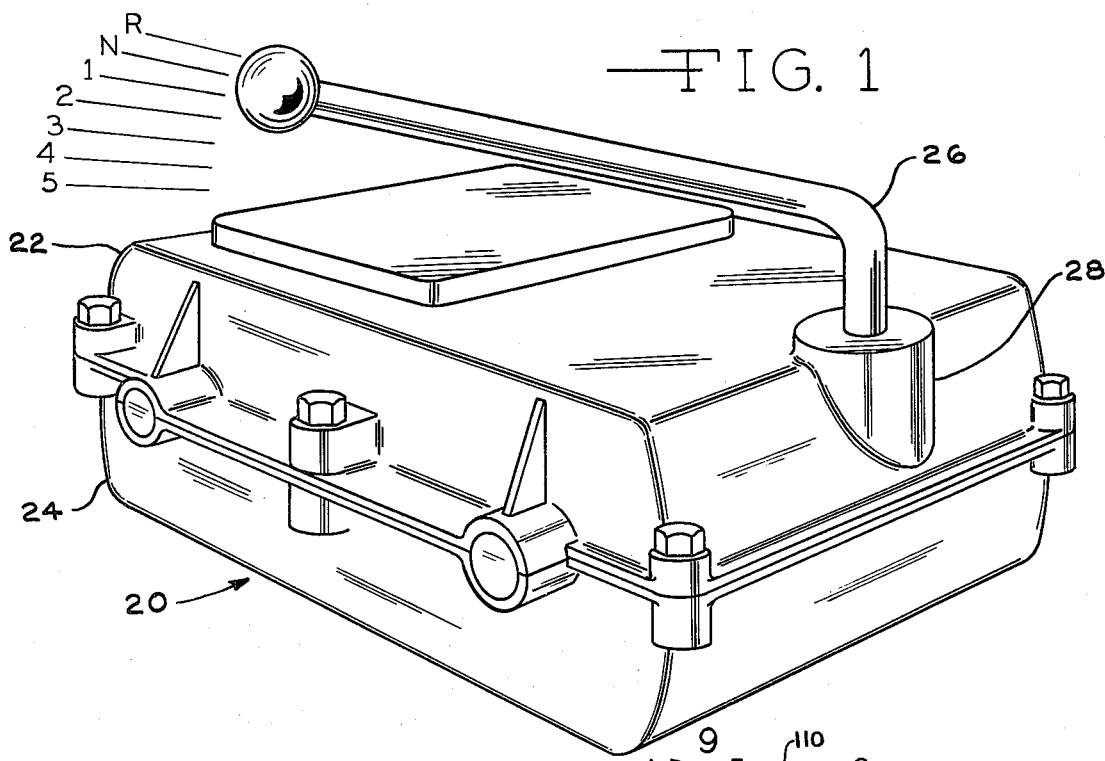
FIG. 1 is a view in perspective of a transmission embodying shift mechanism according to the invention and showing a plurality of shift positions of a shifting lever.

FIG. 1 shows a transmission embodying the invention, the transmission including a housing 20 having an upper half 22 and a lower half 24 with a shift lever 26 pivotally mounted in a boss 28 of the housing. The lever 26 can be pivoted to place the transmission in any of reverse, neutral, and five forward speeds. The transmission, as shown, is substantially the same size as transmissions heretofore known having only three forward speeds. Consequently, the transmission 20 can be used even in small vehicles having tight space requirements, such as small riding lawn mowers.

Referring particularly to FIG. 2, the transmission includes, in this instance, an intermediate shaft 30 and an output shaft 32 which are rotatably mounted in suitable bearings 34 in the housing 20. The intermediate shaft 30 has a central driven bevel gear 36 mounted thereon which is driven by a bevel gear (not shown) located therebelow on an input shaft extending through the bottom of the lower housing half 24 to suitable drive means. The bevel gear 36 is affixed to the shaft 30 by a key 38 projecting into a keyway 40 in the gear 36. A reverse sprocket 42 and five forward speed gears 44–52 are also affixed to the shaft 30 through keys 54 and 56 and corresponding keyways in the sprocket and gears. Actually, the gears 44 and 46 are a single combination gear.

The output shaft 32 actually consists of a core 58 and sleeves 60 and 62. The shaft 32 could be of a one-piece construction from a functional standpoint but it has been found that the core and sleeve construction is less expensive to manufacture. The core 58 has a non-circular central portion 64 with two spaced grooves 66 therein. The core further has a cylindrical right end portion 68, as viewed in FIG. 2, on which is keyed an output gear or sprocket 70. An adjacent, second cylindrical portion 72 is rotatably received in one of the bearings 34 and a third cylindrical portion 74 receives a toothed member or reverse sprocket 76 which is freely rotatable thereon and is connected to the reverse sprocket 42 through a suitable chain 78. Four additional toothed members or forward speed gears 80–86 are freely rotatably mounted on the sleeves 60 and 62 and mesh with the corresponding forward speed gears 44–50. Finally, a further toothed member or fifth forward speed gear 88 is freely rotatably mounted on a cylindrical left end portion 90 of the shaft core 58.

The sleeves 60 and 62 are identical in this instance. They include outer cylindrical surfaces 92 and inner non-circular bores or passages 94 which are received on the non-circular portion 64 of the core 58 of the shaft 32 and rotate therewith. The sleeves 60 and 62 further include two diametrically-opposite guide means in the form of channels or grooves 96 extending the length thereof and opening at both ends of the sleeves.

Figure 6:
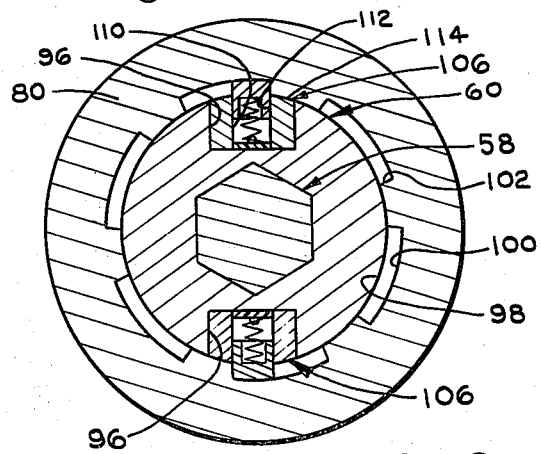
FIG. 6 is an enlarged view in transverse cross section taken along the line 6—6 of FIG. 3.

The first four forward speed gears 80–84 have substantially identical hub designs. As shown in FIGS. 3, 4, and 6, the first forward speed gear 80, which is representative of the four gears, has a solid, unbroken hub 98 extending through a substantial portion of its thickness and is rotatably supported on the sleeve 60. Adjacent the hub 98, the gear 80 has six arcuate recesses or notches 100 separated by six engageable means or dogs 102. The forward speed gears also have inner annular beveled or truncated conical edges indicated at 104 between the arcuate recesses and the hubs. The other three forward speed gears differ only in that the length of the hubs relative to the recesses vary, with the recesses in all four gears being on the sides of the gears toward the center of the transmission. The recesses do not need to extend throughout the thickness of the gears when resiliently-mounted keys are used, but can be used with the solid hubs. Consequently, the gears have greater bearing surfaces on the shaft 32 and specifically on the sleeves 60 and 62. With gears heretofore used in draw-key shift mechanisms, the sole contact between the gears and the shaft was at the ends of the dogs separating the arcuate recesses, since the notches or recesses of the gears had to extend completely therethrough for the keys to pass through, and the portions of the gears adjacent the dogs had to be removed entirely to leave annular cavities in which the keys could be received without contacting and engaging any portion of the gears.

Figure 5:
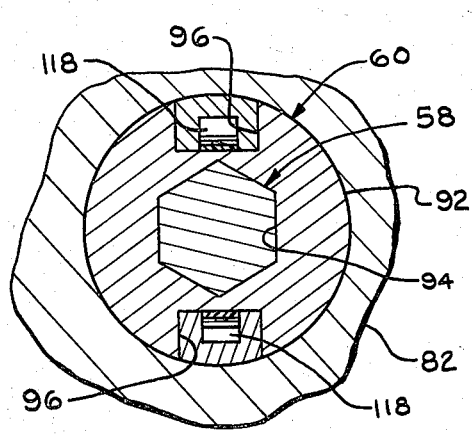
FIG. 5 is an enlarged view in transverse cross section taken along the line 5—5 of FIG. 3.

Mechanism for individually selecting and engaging the four forward speed gears will now be discussed. Two carriers 106 and 108 (FIGS. 3, 5, and 6 in particular) are located in the channels 96 of the sleeves 60 and 62 on each side of the shaft. One carrier could be used in place of two aligned ones. However, a single long carrier presents more problems in manufacturing, such as warpage from heat treatment. Each of the carriers has an elongate recess or channel 110 therein with rectangular openings 112 extending outwardly from the recess 110 to an outer, arcuate surface 114 which lies in co-cylindrical relationship with the outer surface 92 of the sleeve 60 or 62. There are two of the openings 112 in each of the carriers 106 and 108, the carriers differing only in the spacing or positioning of the openings 112.

Four projections or keys 116-122 are spaced apart predetermined distances in the rectangular openings 112 of each pair of the aligned carriers 106 and 108 on each side of the shaft 32. By employing two assemblies of the carriers and keys on opposite sides of the shaft 32, two keys engage each gear simultaneously to distribute stress and wear. However, it is not essential to the operation of the transmission that the keys and carriers be employed on both sides of the shaft. The key 116, all of which keys are identical, is shown in more detail in FIG. 4. The key has beveled corners or edges 124 extending transversely so as to be urged downwardly when engaging the truncated conical or beveled surface 104 of the gear 80 or a similar surface 126 formed at an edge of the gear 82, the gear 84 also having such an edge. The key 116 also has lower, outwardly-extending flanges 128, the extremities of which exceed the corresponding dimension across the rectangular opening 112 to constitute stop means which limit outward movement of the key relative to the carrier 106. The key 116 also has a central recess 130 in the lower surface thereof which receives an upper end of resilient means in the form of a spring 132. The lower end of the spring 132 is received over a seating hub 134 of a spring carrier or retaining member 136. The retaining member 136 extends the length of the elongate recess 110 and positions the springs 132 relative to the keys 116–122. The springs 132 normally urge the keys to the outer positions with the upper, beveled corners 124 extending above the arcuate surface 114 of the carriers 106 and 108. When the carriers move longitudinally, however, the cooperation of the beveled corners and the annular truncated, conical surfaces 104 and 124 of the gears easily move the keys downwardly flush with the arcuate surfaces 114. It is not necessary that both the key surfaces and the gear surfaces be beveled, however, to enable the keys to be cammed downwardly during their longitudinal movement.

The spacing of the keys 116–122 is such that only one engages one of the forward speed gears 80–86 at any one time as the carriers 106 and 108 move from right to left. For engaging the reverse sprocket 76, the right-hand ends of the carriers 106 are simply moved into engagement therewith. Referring to FIG. 7, the reverse sprocket 76 has a central raised collar 138 with two raised outwardly-extending diametrically-opposite dogs 140 extending therefrom. The ends of the carriers 106 engage the edges of these dogs when moved toward the reverse sprocket 76, with the collar 138 maintaining the end of the sleeve 60 in position.

A somewhat similar arrangement is provided to engage the fifth forward speed gear 88 (FIG. 8). The gear in this instance has arcuate recessed areas 142 which form a raised annular collar 144 and dogs 146. These dogs are engaged by the left ends of the carriers 108 when moved toward the fifth speed gear and into the recessed areas 142.

The reverse sprocket and the fifth forward speed gear could be engaged by employing additional keys similar to the keys 116–122. However, by using the ends of the carriers 106 and 108 to accomplish this purpose, the number of parts needed in producing a transmission can be correspondingly reduced, along with the cost thereof.

Means are located at a central portion of the transmission 20, between the second forward speed gear and the third forward speed gear, for retaining the sleeves 60 and 62 in place and for retaining the gears and sprocket in two clusters with space therebetween. The retaining means are in the form of spaced washers or retaining members 148 and 150 which are seated in the grooves 66 and engage the inner ends of the sleeves 60 and 62. Referring to FIG. 9, the washer 148, which is the same as the washer 150, includes a non-circular or hexagonal opening 152 which is of the same shape as the cross-sectional shape of the non-circular portion 64 of the core 58. The washer also has two diametrically-opposite openings 154 therein which are shaped similarly to the transverse cross-sectional shape of the carrier 106 to receive the carriers, with similar openings in the washer 150 receiving the carriers 108. Each of the washers is assembled with the core by aligning the non-circular opening 152 with the non-circular portion 64 of the core 58 and sliding the washer thereon until it is aligned with the corresponding annular groove 66. The washer is then turned through an arc of 30° to place the openings 154 in a position to receive the carriers 106 or 108, with the opening 152 then offset from the core portion 64, as shown in FIG. 9. The washers are held in this position by the cooperation of the openings 154 with the carriers 106 and 108, the carriers being held in position by the sleeves 60 and 62.

Shifting means of suitable design are located between the retaining members 148 and 150 to move the carriers 106 and 108 longitudinally. As shown in FIGS. 2 and 10, the means include a central collar 156 located centrally of the shaft 32 and engaging the ends of the carriers 106 and 108. The collar 156 has a central non-circular opening or passage 158 received on the non-circular portion 64 of the core 58 and has an annular central groove 160 extending therearound. The collar also has two pair of diametrically-opposite notches 162 and 164 of generally T-shaped configuration which receive similarly shaped ends 166 and 168 of the carriers 106 and 108.

The collar 156 can be shifted by a shifter fork 170, as shown particularly in FIG. 10. The fork 170 includes fingers 172 of elliptical transverse cross-sectional shape projecting into the groove 160 of the collar 156. The fingers are carried on arcuate arms 174 which extend from a hub 176. The hub 176, in turn, is pinned to a vertically-extending portion 178 of the shift lever 26 located within the housing of the transmission and suitably journaled in an internal boss 179 in the lower housing half 24, along with the external boss 28 of the upper housing half 22. The shifter fork 170 is pivoted back and forth along with the shift lever 26 to correspondingly move the collar 156 and the carriers 106 and 108. Relatively little motion of the shift lever 26, a 30° arc being sufficient, is necessary to shift the transmission through its entire range from reverse to fifth speed forward. The usual detents or similar means can be employed with the fork or shift lever to hold them in a particular position, if desired. However, in all positions but neutral, the projecting key will hold the shift mechanism in the position to which it is moved. As shown, a ball 180 is urged toward the lower arm 174 by a spring 182 in a recess 184 in the lower housing 24. In neutral, the ball 180 partially projects in a recess 186 in the fork.

The overall operation of the transmission will now be discussed. With the collar 156 and the carriers 106 and 108 in the extreme right-hand position, as shown in FIG. 11, the ends of the carriers 106 are engaged with the dogs 140 of the reverse sprocket 76 so that the reverse sprocket now drives the shaft 32 through the carriers 106, the sleeve 60, and the non-circular portion 64 of the core 58 of the shaft 32.

When the collar 156 and the carriers 106 and 108 are moved one increment toward the left, 0.120–0.150 inch being sufficient, the carrier 106 is moved out of engagement with the reverse sprocket 76 and the four keys 116–122 are out of engagement with their respective gears 80–86. The outer ends of the carriers 108 are also spaced from the fifth speed gear 88. Consequently, in this position, as shown in FIG. 12, the transmission is in neutral. More specifically, the keys 116, 118, and 122 are held down by the solid hubs 98 of the gears 80, 82, and 84 and the keys 120 project outwardly in the space between the washers 148 and 150.

When the carriers 106 and 108 are moved one more increment to the left, the first keys 116 move into longitudinal alignment with the arcuate recesses 100 of the first gear 80 and project into the recesses to engage the next dogs 102 therein. The transmission is then in first gear. There is no need for holding or forcing the shift lever in a manner to engage the keys with the dogs since this is done automatically as the keys rotate with the sleeves and core relative to the gear causing the keys to be aligned with the gear recesses, at which time the keys extend outwardly into the recesses to engage the dogs, by virtue of the outer pressure exerted by the springs 132. In this position, with the forward speed gear 80 engaged, the second keys 118 are held down by the hub of the gear 82 and the keys 122 are still held down by the hub of the gear 84, with the keys 120 still projecting upwardly in the space between the washers.

Continued movement of the carriers 106 and 108 toward the left next causes the keys 118 to engage the gear 82 to place the transmission in the second forward speed. The next movement causes the keys 120 to engage the gear 84 and place the transmission in third speed forward. With the next movement of the carriers, the fourth keys 122 engage the gear 86, as shown in FIG. 13, to place the transmission in the fourth speed forward. Finally, the extreme left-hand movement of the carriers 106 and 108 causes the left ends of the carriers 108 to engage the dogs 146 of the fifth forward speed gear 88.

The total gear range from reverse to fifth speed forward can be accomplished with less than an inch of movement of the carriers 106 and 108. In contrast, with draw-key shifts heretofore known, movement of the key usually required a distance equal to the total thickness of the pack of gears, plus the thickness of any washers therebetween, in order to shift through the entire range. To reduce this movement, the gears were often made as thin as possible which sometimes caused early wear and failure. In any event, a distance in the transmission equal to the thickness of the gear pack was required for movement of the shift means for the key, resulting in about one-half the transmission housing being empty except for the shift means.

Various modifications of the above described embodiment of the invention will be apparent to those skilled in the art and it is to be understood that such modifications can be made without departing from the scope of the invention, if they are within the spirit and the tenor of the accompanying claims.

We claim:

1. A transmission comprising a rotatably-mounted shaft having longitudinally-extending guide means, a plurality of toothed members rotatably mounted on said shaft, each of said members having engageable means, selector means comprising a plurality of spaced projections cooperating with said guide means and extending outwardly from a common side thereof, there being one of said projections for each of at least some of said members, each of said projections being engageable with the engageable means of one of said members to cause that member to rotate with said shaft when so engaged, spacing means associated with said projections for spacing them apart distances such that not more than one of said projections is engaged with the engageable means of one of said members for any position of said projections and said spacing means along said guide means, resilient means for urging said projections outwardly from said shaft, and means for moving said projections and said spacing means along said guide means and along said shaft.

2. A transmission according to claim 1 characterized by said guide means comprises a groove in said shaft, and said spacing means comprises a carrier having a plurality of openings in which said projections are transversely movable.

3. A transmission according to claim 1 characterized by at least some of said members having hubs adjacent said engageable means, and said projections having beveled edges, whereby longitudinal movement of said projections along said shaft and into engagement with said hubs will force said projections out of communication with the corresponding engageable means.

4. A transmission according to claim 1 characterized by said moving means comprises a collar on said shaft and having means for engaging said spacing means, and a pivotable fork engageable with said collar to move said collar longitudinally of said shaft.

5. A transmission according to claim 4 characterized by said collar having at least two oppositely-extending notches, there being two of said spacing means having ends engaged in said notches.

6. A transmission according to claim 1 characterized by said toothed members comprising a plurality of forward speed gears, said moving means being located along said shaft between two of the forward speed gears.

7. A transmission according to claim 6 characterized by said toothed members further comprising a reverse sprocket having engageable means, and said spacing means being engageable with said engageable means of said reverse sprocket for one position of said spacing means along said guide means.

8. A transmission comprising a rotatably-mounted shaft having a longitudinally-extending groove therein, a plurality of gears rotatably mounted on said shaft, at least some of said gears each having a recess which can communicate with said groove of said shaft, gear selector means comprising a carrier positioned within said groove of said shaft, said carrier having mounted thereon a plurality of spaced projections extending from a common side thereof and adapted to extend within the recesses of the gears to individually connect said gears and said shaft, resilient means movable with said carrier and extending outwardly into engagement with said projections, carrier-moving means on said shaft and engageable with said carrier to move said projections relative to said gears longitudinally of said shaft, and means for moving said moving means along said shaft to move said carrier and said projections carried thereby.

9. A transmission according to claim 8 characterized by a toothed member rotatably mounted on said shaft and having engageable means thereon, and said carrier being engageable with said engageable means when in one position in said groove.

10. A transmission according to claim 8 characterized by each of said gears having a hub extending completely around the shaft and having a thickness less than the thickness of the gear, a plurality of dogs located adjacent said hub for each of said gears and extending toward the shaft, said gear having circumferentially-extending recesses between said dogs.

11. A transmission according to claim 8 characterized by a seating member movable with said carrier for supporting said resilient means.

12. A transmission according to claim 8 characterized by said carrier having a transverse opening therein for each of said projections and stop means associated with each of said projections for limiting the extent of movement of said projections outwardly from said carrier.

13. A transmission according to claim 12 characterized by said resilient means comprising a spring engageable with each of said projections.

14. A transmission according to claim 13 characterized by each of said springs being a coil spring.

15. A transmission comprising a rotatably-mounted shaft having a plurality of gears rotatably mounted thereon, at least some of said gears each having dogs adjacent said shaft, gear selector means comprising a carrier mounted for longitudinal movement on said shaft, a plurality of spaced projections mounted on said carrier for movement transverse to the longitudinal extent of said shaft, there being one of said projections for each of at least some of said gears, said carrier spacing said projections apart distances such that not more than one of said projections engages one of the gears for any position of said carrier on said shaft to enable not more than one gear to be engaged and rotatable with said shaft at any one time, and resilient means engageable with said projections for urging said projections from said carrier toward said gears.

16. A transmission according to claim 15 characterized by a reverse sprocket also being rotatably mounted on said rotatably-mounted shaft, said sprocket also having at least one dog, said carrier having an end effective to engage said sprocket dog when none of said gears is engaged.

17. A transmission according to claim 15 characterized by said gears having hubs adjacent said dogs, and said projections having beveled edges, whereby longitudinal movement of said projections into engagement with said hubs will force said projections out of communication with the corresponding dogs.

18. A transmission according to claim 15 characterized by said resilient means comprising a coil spring engageable with each of said projections.

19. Apparatus according to claim 15 characterized by said moving means comprising a ring collar extending around said shaft and engageable with said carriers.

20. Apparatus according to claim 15 characterized by retaining means on said shaft and effective to maintain said gears in at least two spaced clusters along said shaft.

21. Apparatus according to claim 20 characterized by said moving means being located, at least in part, in space between said clusters.

22. A transmission comprising a rotatably-mounted shaft having a longitudinally-extending groove therein, a plurality of gears rotatably mounted on said shaft, at least some of said gears each having a recess which can communicate with said groove of said shaft, gear selector means comprising a carrier positioned within said groove of said shaft, said carrier having mounted thereon a plurality of spaced projections extending from a common side thereof and adapted to extend within the recesses of the gears, resilient means movable with said carrier and extending outwardly into engagement with said projections, carrier-moving means on said shaft and engageable with said carrier to move said projections relative to said gears longitudinally of said shaft, means for moving said moving means along said shaft to move said carrier and said projections carried thereby, a seating member movable with said carrier for supporting said resilient means, said carrier having an elongate recess in which said seating member is located.

23. A transmission comprising a rotatably-mounted shaft having a longitudinally-extending groove therein, a plurality of gears rotatably mounted on said shaft, at least some of said gears each having a recess which can communicate with said groove of said shaft, gear selector means comprising a carrier positioned within said groove of said shaft, said carrier having a width slightly less than the width of said groove and having an outer arcuate surface with a radius of curvature substantially the same as the radius of said shaft, said carrier having mounted thereon a plurality of spaced projections extending from a common side thereof and adapted to extend within the recesses of the gears, resilient means movable with said carrier and extending outwardly into engagement with said projections, carrier-moving means on said shaft and engageable with said carrier to move said projections relative to said gears longitudinally of said shaft, and means for moving said moving means along said shaft to move said carrier and said projections carried thereby.

* * * * *